United States Patent
Golic (10) Patent No.: US 7,913,083 B2
(45) Date of Patent: Mar. 22, 2011

(54) SECRET-KEY-CONTROLLED REVERSIBLE CIRCUIT AND CORRESPONDING METHOD OF DATA PROCESSING

(75) Inventor: Jovan Golic, Turin (IT)

(73) Assignee: Telecom Italia S.p.A., Milan (IT)

( * ) Notice: Subject to any disclaimer, the term of this patent is extended or adjusted under 35 U.S.C. 154(b) by 658 days.

(21) Appl. No.: 10/568,618

(22) PCT Filed: Sep. 5, 2003

(86) PCT No.: PCT/IT03/00532
§ 371 (c)(1), (2), (4) Date: Feb. 16, 2006

(87) PCT Pub. No.: WO2005/025124
PCT Pub. Date: Mar. 17, 2005

(65) Prior Publication Data
US 2006/0236102 A1    Oct. 19, 2006

(51) Int. Cl.
*H04L 9/32* (2006.01)

(52) U.S. Cl. .................................. 713/168; 380/37

(58) Field of Classification Search .................. 713/168, 713/161; 380/29, 36, 37, 42, 200, 210, 277
See application file for complete search history.

(56) References Cited

U.S. PATENT DOCUMENTS

| | | | | |
|---|---|---|---|---|
| 4,195,200 A * | 3/1980 | Feistel | | 380/37 |
| 5,261,003 A * | 11/1993 | Matsui | | 380/264 |
| 5,825,888 A * | 10/1998 | Kimura et al. | | 380/270 |
| 5,850,452 A * | 12/1998 | Sourgen et al. | | 713/190 |
| 5,943,421 A * | 8/1999 | Grabon | | 380/269 |
| 6,314,187 B1 * | 11/2001 | Menkhoff et al. | | 380/28 |
| 6,804,355 B1 * | 10/2004 | Graunke | | 380/37 |
| 7,216,285 B2 * | 5/2007 | Chen | | 714/781 |
| 7,308,099 B1 * | 12/2007 | Allamanche et al. | | 380/210 |
| 7,366,300 B2 * | 4/2008 | Qi et al. | | 380/29 |
| 2002/0009196 A1 * | 1/2002 | Lim | | 380/37 |
| 2002/0012430 A1 * | 1/2002 | Lim | | 380/29 |
| 2002/0106078 A1 * | 8/2002 | Qi et al. | | 380/29 |
| 2002/0166058 A1 * | 11/2002 | Fueki | | 713/194 |

(Continued)

OTHER PUBLICATIONS

Viktor Fisher and Milos Drukarovsky, Two methods of Ringael Implementation in Reconfigurable Hardware, 2001, sprinnger-verlag Berlin Heidelberg 2001.*

(Continued)

*Primary Examiner* — Matthew B Smithers
*Assistant Examiner* — Abu Sholeman
(74) *Attorney, Agent, or Firm* — Finnegan, Henderson, Farabow, Garrett & Dunner, L.L.P.

(57) ABSTRACT

A combinatorial key-dependent network suitable for the encryption/decryption of data on buses and in memories of data-processing devices, has a number of layers, where each layer has a number of elementary building blocks operating on very small block sizes. A generic building block acts on a small number of input data bits, which are divided into two groups of m and n bits, respectively. The m input bits, which are passed to the output intact, are used to select k out of $2^m k$ key bits by a multiplexer circuit; the k bits are then used to select an (n×n)-bit reversible transformation acting on the remaining n input bits to produce the corresponding n output bits. The total number of the key bits in the building block is thus $2^m k$, which can easily he made larger that m+n. An inverse building block is the same except that the reversible transformations are replaced by their inverses.

41 Claims, 3 Drawing Sheets

U.S. PATENT DOCUMENTS

| | | | | |
|---|---|---|---|---|
| 2003/0005313 A1* | 1/2003 | Gammel et al. | | 713/189 |
| 2003/0005314 A1* | 1/2003 | Gammel et al. | | 713/189 |
| 2003/0108195 A1* | 6/2003 | Okada et al. | | 380/37 |
| 2003/0115534 A1* | 6/2003 | Kojima et al. | | 714/758 |
| 2003/0198345 A1* | 10/2003 | Van Buer | | 380/43 |
| 2003/0231766 A1* | 12/2003 | Hanounik | | 380/43 |
| 2004/0228493 A1* | 11/2004 | Ma | | 380/286 |
| 2005/0147242 A1* | 7/2005 | Rueping | | 380/28 |

OTHER PUBLICATIONS

Alfred J. Menezes, Applied Cryptography, 1997 by CRC press LLC. p. 250-254.*

Jovan D. Golic, DeKaRT: A New Paradigm for Key-Dependent Reversible Circuits, 2003, CHES 2003, Spinger-Verlag Berlin Heidelberg 2003, pp. 98-112.*

Schneier; "Still Other Block Ciphers"; Applied Cryptography Second Edition, John Wiley & Sons, pp. 331-332, 346-351 and 357-363, (1996).

Menezes; "Chapter, 7, Block Ciphers"; Handbook of Applied Cryptography, CRC Press, Chapter 7, pp. 250 and 251.

Daemen et al."The Design of Rijndael"; The Advanced Encryption Standard, Information Security and Crytography, Springer Verlag, pp. 31-51, (2000).

U.S. Department of Commerce/National Institute of Standards and Technology; "Data Encryption Standard (DES)"; FIPS PUB 46-3, pp. 1-22, (1999).

Brier et al.; "Fast Primitives for Internal Data Scrambling in Tamper Resistant Hardware"; CHES 2001, LNCS 2162, pp. 16-27, (2001).

Communication from European Patent Office pursuant to Article 94(3) EPC, mailed Dec. 16, 2008 in corresponding Application No. 03758653.4 (5 pages).

Menezes; "Chapter 7, Block Ciphers"; Handbook of Applied Cryptography, CRC Press, Chapter 7, pp. 250-256 (1997).

* cited by examiner

SECRET-KEY-CONTROLLED REVERSIBLE CIRCUIT AND CORRESPONDING METHOD OF DATA PROCESSING

CROSS REFERENCE TO RELATED APPLICATION

This application is a national phase application based on PCT/IT2003/000532, filed Sep. 5, 2003, the content of which is incorporated herein by reference.

FIELD OF THE INVENTION

The present invention refers to a data processing method and system, and in particular to a secret-key-controlled reversible circuit used for encrypting and decrypting data.

Reversible transformations controlled by a secret key parameter are mathematical entities used for encrypting and decrypting sensitive data in order to provide data confidentiality. The transformations should be such that it is computationally infeasible to recover the original input data from the transformed output data without knowing the secret key used and, in particular, it should be infeasible to reconstruct the secret key from a number of known input/output pairs. In addition, they should be relatively easy to implement in software and/or hardware.

BACKGROUND ART

Block and stream ciphers are two general types of such transformations. Block ciphers are block transformations which operate on digital data arranged in blocks of consecutive symbols, whereas stream ciphers are sequential transformations which operate on digital data sequences, typically processing one symbol at a time. Examples of block ciphers are illustrated as AES and DES in J. Daemen and V. Rijmen, The design of Rijndael: AES—The Advanced Encryption Standard. Berlin: Springer_Verlag, 2002, and in National Bureau of Standards, "Data Encryption Standard", Federal Information Processing Standards Publication 46, January 1977, respectively.

Cryptographic functions dealing with secret keys such as, for example, block or stream ciphers or message authentication codes can be implemented in software on a microelectronic data-processing device such as, for example, an integrated circuit chip card, which contains a central processing unit (CPU), such as a microprocessor, one or more volatile memories, such as a random-access memory (RAM), and one or more non-volatile memories, such as an electrically erasable programmable read-only memory (EEPROM), a flash memory, and a read-only memory (ROM). During the execution of the cryptographic function, sensitive data depending on the secret key is being sent over the data bus(es) connecting the CPU and the memories and is being stored in the RAMs in the system. In this embodiment, the sensitive information is the secret key itself and all intermediate data depending on the secret key, except for the output data. Even for tamper-resistant chips, where the underlying integrated circuit is protected by special physical measures, such as protective layers and various sensors and detectors, this sensitive information may leak out through various side channels, such as, for example, timing measurement, power analysis measurement, electromagnetic radiation, and microprobing.

Document U.S. Pat. No. 5,850,452 illustrates a method for the numerical scrambling by permutation of data bits in a programmable circuit comprising a control unit and a data bus to transmit data between the control unit and several memory circuits.

While, for a cryptographic function, it should be computationally infeasible to reconstruct the secret key from known input/output data, this need not be the case if intermediate data generated during the execution is revealed. Therefore, there is a need to protect the sensitive data on the data bus and in the memories by using dedicated encryption/decryption techniques sometimes referred to as data scrambling. This is especially useful against the probing attacks. Probing attacks are invasive side-channel techniques consisting in introducing conductor microprobes into certain points of a tamper-resistant chip to monitor and analyse the electrical signals at these points, in order to recover sensitive information about the secret key. In this regard, potentially most vulnerable points are those corresponding to internal links or memories that are likely to convey or contain secret information and whose hardware implementation has a regular, recognizable structure, such as the data buses and the RAMs in the data-processing device.

Document U.S. Pat. No. 5,943,421 contains a description of a data-processing device where the data stored in memories (including RAM) are encrypted and compressed. The device uses a hardware unit for encryption/compression and decryption/decompression which is transparent to the other components.

The encryption/decryption of data solely on the data or instruction buses can be achieved by using a fast stream cipher combining the data sequence with the keystream sequence being the output sequence of a fast centralized random or pseudorandom number generator possibly by the bitwise XOR operation, as illustrated for example in US 2003/0005313 and in US 2003/0005314.

Recall that the XOR of two bits is equal to 0 if the two bits are equal and to 1 otherwise. More precisely, at each time the block of data is bitwise XORed with the keystream block. Note that the pseudorandom number generator is a sequential rather than combinatorial circuit. However, this solution is not satisfactory for encrypting or decrypting the data to be stored in or read out of the memories, respectively, because the same keystream block has to be used for decrypting and encrypting the data for a particular location in a given memory. The reversible transformations can also depend on the address of the memory location, whereas the address can be encrypted too, so that the data is effectively stored in a memory location whose address is an encrypted version of the original logical address.

For the encryption/decryption of data in memories, it has been proposed to use hardware implementations of block ciphers, which requires a large number of gates and induces a long delay. Document US 2002/0166058 A1 contains a description of a data-processing device, to be implemented on an integrated circuit chip card, where both the address and the data to be stored in memory such as RAM are encrypted/decrypted by a DES-like block cipher, with 16 rounds, implemented in programmable hardware.

Some simplifications of classical block ciphers, e.g. with a reduced number of rounds and a reduced block size, have been also proposed. In principle, the simplifications can also be used for encrypting/decrypting the data and address buses. However, these simplifications are not capable of incorporating a sufficiently large number of secret key bits to resist some well-known structural attacks such as the meet-in-the-middle attacks, especially if the block sizes are relatively small. Note that in the classical block ciphers, the secret key bits are typically bitwise XORed with the output bits of individual rounds. To increase the number of secret key bits, it is also proposed to use secret-key-controlled bit permutations, but they do not offer a satisfactory security level and the number of secret key bits remains small if the required block size is small.

Some logical circuits for implementing secret-key-controlled bit permutations, to be used for data scrambling against probing attacks on integrated circuit chip cards, are proposed in E. Brier, H. Handschuh, and C. Tymen, "Fast primitives for internal data scrambling in tamper resistant hardware," Cryptographic Hardware and Embedded System—CHES 2001, Lecture Notes in Computer Science, vol. 2162, pp. 16-27, 2001.

In conclusion, the current solutions for the encryption/decryption of data in memories are not satisfactory, especially if the block sizes are small such as, for example, 16 bits or less.

Accordingly, there is a need for new designs of secret-key-dependent reversible logical circuits suitable for small-size, in terms of the number of gates, and high-speed, in terms of the induced delay, hardware implementations. They should be able to incorporate a relatively large number of secret key bits and to operate on small and possibly variable block sizes.

SUMMARY OF THE INVENTION

In view of the above, it is an object of the invention to provide a new method and a device for designing secret-key-controlled reversible logical circuits that are suitable for the encryption/decryption of data on buses and in memories of data-processing devices.

According to the present invention, that object is achieved by means of a combinatorial network having the features set forth in the claims that follows. The invention also relates to a corresponding method of encryption/decryption of digital data.

The proposed solution has iterative and granular structure, that is, consist of a number of layers, where each layer comprises a number of elementary building blocks operating on very small block sizes.

A generic building block acts on a small number of input data bits, which are divided into two groups of m and n bits, respectively. The m input bits, which are passed to the output intact, are used to select k out of $2^m k$ key bits by a multiplexer circuit; The k bits are then used to select an (n×n)-bit reversible transformation $R_k$ acting on the remaining n input bits to produce the corresponding n output bits. The total number of the key bits in the building block is thus $2^m k$, which can easily be made larger than m+n. An inverse building block is the same except that the reversible transformations $R_k$ are replaced by their inverses $R_k^{-1}$.

Each block is thus capable of incorporating a large number of secret key bits, has a small number of gates, and a short delay. Building blocks are arranged in layers and the layers can be connected by fixed bit permutations.

DETAILED DESCRIPTION OF THE PREFERRED EMBODIMENTS

A secret-key-controlled reversible logical circuit according to the invention is a combinatorial network comprising a number of layers each including a number of elementary building blocks, each block implementing a key-dependent reversible transformation.

Figure 1:
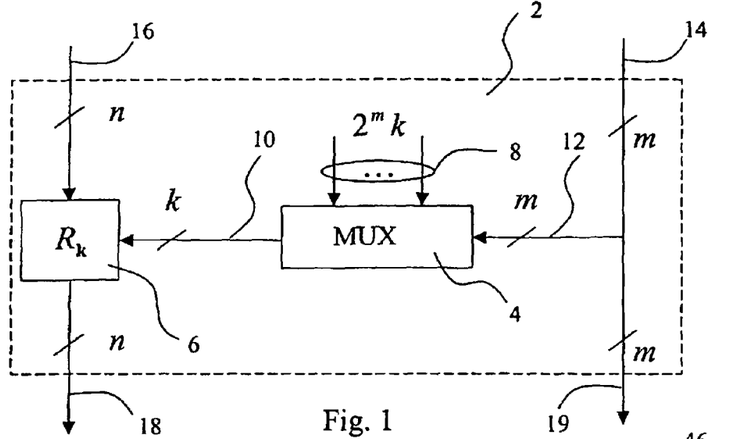
FIG. 1 is a block diagram of a generic building block of a secret-key-controlled logical circuit realised according to the invention.

A generic building block 2 is shown in FIG. 1. It acts on a small number of input data bits, divided into two groups of m control and n transformed bits, respectively, for example, m+n<=16. The m control bits 14, which are taken intact to the output 19, are used to select k out of $2^m k$ secret key bits by a multiplexer circuit 4 having m control bits 12, 2 m k-bit inputs 8, and one k-bit output 10. The multiplexer circuit 4 may be implemented as a m×k lookup table, i.e., k (binary) m×1 lookup tables whose content is defined by the secret key.

The selected k bits, i.e. output 10 of the multiplexer 4, are used to choose an (n×n)-bit reversible transformation $R_k$ (block 6 in FIG. 1) acting on the remaining n input bits 16, hence called the transformed bits, to produce the corresponding n output bits 18. The set of the reversible transformations $R_k$ for a generic block can be arbitrary, and preferably it has to be easily implementable by a logical circuit with n+k input bits and n output bits. Note that the total number of secret key bits in the building block is thus $2^m k$, which can easily be made (much) larger than the underlying block size m+n.

The inverse building block has the same circuit architecture, except that the reversible transformations $R_k$ are replaced by their inverses $R_k^{-1}$.

Figure 2:
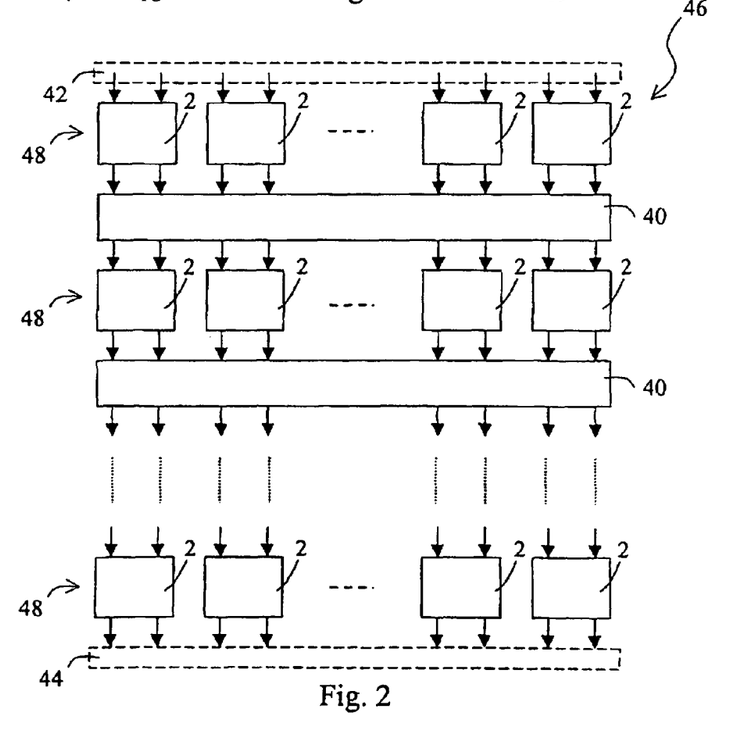
FIG. 2 is a block diagram of an array structure of a secret-key-controlled logical circuit realised according to the invention.

A combinatorial network 46 comprising a number of layers 48 each including a number of elementary building blocks 2 is shown in FIG. 2.

The network 46 operates on N input bits 42, in each layer 48, N bits are divided into small blocks and each of them is transformed by an elementary building block 2. Each layer 48 is thus a parallel combination of a number of building blocks. In a uniform design, all the building blocks are of the same type, nevertheless different implementations of building blocks may be used in a single combinatorial network.

The layers 48 are connected by fixed bit permutation blocks 40, which, in order to obtain greater security, preferably satisfy the following two diffusion properties. In an inverse combinatorial network, inverse bit permutations have to be used. If m=n, then the used bit permutations can be made equal to their inverses.

The first property is that the control bits in each layer are used as transformed bits in the next layer. In each layer, the number of control bits cannot hence exceed the number of transformed bits, so that in a uniform design, m<=n.

The second property is that, for each building block, both control bits and transformed bits are extracted from the maximal possible number of building blocks in the preceding layer. In a uniform design, this number equals min(m, N/(m+n)) for the control bits and min(n, N/(m+n)) for the transformed bits.

As an alternative, it can be acceptable that the requirements of the second property are fulfilled only partially, i.e. control bits and transformed bits are extracted from a great number (not the maximal possible number) of building blocks in the preceding layer.

Figure 3:
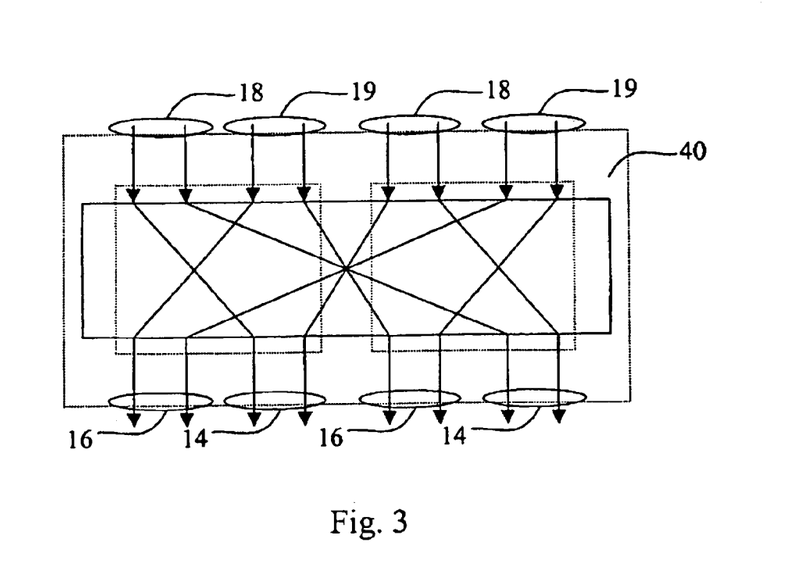
FIG. 3 is a block diagram of a first embodiment of a block connecting adjacent layers.

A possible embodiment for a fixed bit permutation block 40 for N=8 and two blocks per layer with parameters m=n=2 is shown in FIG. 3. The first and the second properties are verified in the embodiment shown in FIG. 3.

In a uniform design, all the blocks 40 connecting adjacent layers 48 are of the same type, nevertheless different embodiments of block 40 can be implemented in a single combinatorial network 46.

For data scrambling, that is, for encryption/decryption of buses and memories in data-processing devices, a relatively small number of layers may suffice, e.g., 3 to 5.

For cryptographic security, a number of desirable additional criteria are also proposed.

First, the number of building blocks 2 per each layer 48 should be at least 2.

Second, the reversible transformations $R_k$ should be such that each output bit of $R_k$ is a nonlinear function of n input data bits and k key bits with the algebraic normal form containing at least one binary product involving both input data and key bits. For example, this is satisfied by the reversible transformations shown in FIG. 5, which will be explained in detail later.

Figure 5:
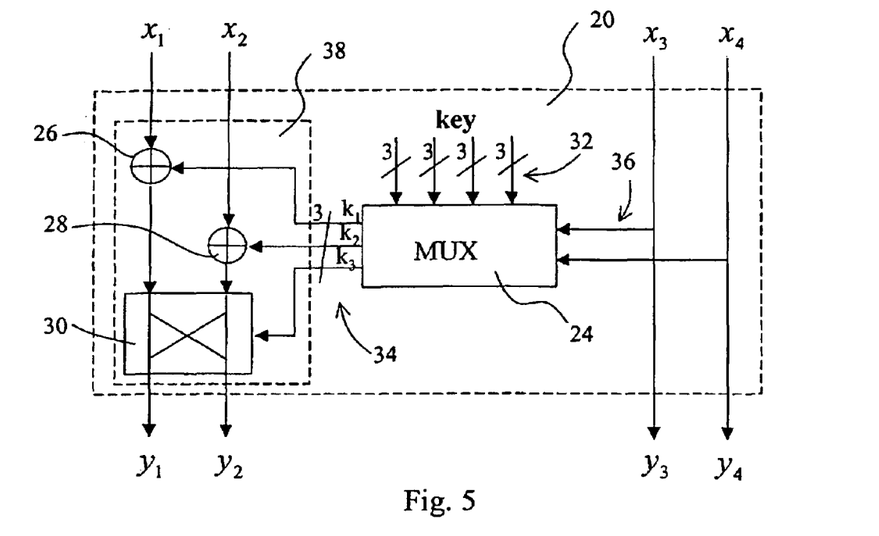
FIG. 5 is a block diagram of a particular embodiment of a building block, realised according to the invention.

More precisely, for the scheme of FIG. 5, the algebraic normal form for the output bits $y_1$ and $y_2$ is:

$$y_1 = k_1 \oplus k_1 \cdot k_3 \oplus k_2 \cdot k_3 \oplus x_1 \oplus k_3 \cdot x_1 \oplus k_3 \cdot x_2$$

$$y_2 = k_2 \oplus k_2 \cdot k_3 \oplus k_1 \cdot k_3 \oplus x_2 \oplus k_3 \cdot x_2 \oplus k_3 \cdot x_1$$

where the key bits $k_1$ and $k_2$ are used for the XOR gates 26, 28 and the key bit $k_3$ is used for controlling the switch 30. Here '$\oplus$' denotes the XOR operation and denotes the binary product operation.

The transformed and control input bits at each layer are thus nonlinearly combined together.

The second criterion implies that n>=2, as the only reversible functions of one binary variable are the identity and the binary complement functions, so that the single key bit has to be XORed with the input bit to obtain the output bit. The second criterion is not satisfied if k=n and the key bits are bitwise XORed with n input data bits, as in the usual Feistel structure used in DES.

Third, the reversible transformations $R_k$ should satisfy a Shannon-type criterion that the uncertainty of n input bits provided by uniformly used random k key bits when the output n bits are known is maximal possible, that is, n bits. For this it is necessary that k>=n. The third criterion can easily be satisfied by bitwise XORing a subset of n key bits with n input data bits, as implemented in FIG. 5.

A simple class of logical circuits implementing the key-dependent reversible transformations $R_k$ consist of XORs of two input bits and (controlled) switches only, where a switch has two input bits, two output bits, and one control bit that determines if the input bits are swapped or not. Clearly, a switch can be implemented by using two multiplexers in parallel, whereas only one multiplexer suffices for implementing an XOR. Here and throughout the present description, unless specified differently, a multiplexer has 2 input bits, 1 control bit, and 1 output bit. For each XOR, one of the two input bits is a key bit, whereas for each switch, the control bit is a key bit.

The key bits are incorporated into the circuit in such a way that there are no equivalent keys, i.e., that different combinations of the key bits give rise to different reversible transformations. This is not a problem for checking since the parameters n and k are small. For each fixed key, such reversible transformations are affine, and the non-linearity is achieved by the key bits depending on the control input data bits. For n=2 note that all 24 reversible transformations of 2 input bits are necessarily affine.

The Shannon-type criterion is not satisfied if the circuit contains the key-controlled switches only.

A basic concrete example of a building block 20 from the class described above, with parameters (m,n,k)=(2,2,3), is shown in FIG. 5.

Two input bits $x_3$, $x_4$ are used for controlling a multiplexer 24 and are passed to the output $y_3$, $y_4$ intact. The input bits $x_3$, $x_4$ select three out of twelve key bits by means of the multiplexer circuit 24, which has two control bits 36, four 3-bit inputs 32 and one 3-bit output 34.

The 3-bit output 34 is used for controlling a block 38, which implements reversible transformations $R_k$, transforming the input bits $x_1$ and $x_2$ into scrambled output bits $y_1$ and $y_2$. Block 38 comprises two XOR gates 26 and 28, each having two input bits and one output bit, and one controlled switch 30 having 2 input bits, 2 output bits, and 1 control bit which determines if the input bits are swapped or not.

The controlled switch 30 can be implemented by using two multiplexers in parallel, whereas only one multiplexer suffices for implementing each of the two XOR gates 26, 28.

The building block 20 shown in FIG. 5 can be implemented by using a circuit of 13 multiplexers with depth 4, where the depth is defined as the number of gates on the longest path from the input to the output. The total number of secret key bits incorporated is 12.

The building block 20 can readily be used for defining concrete data scrambling functions of the uniform type. For example, for N=16 input bits, each layer contains 4 such blocks and hence has a total of 52 multiplexers and incorporates 48 key bits. Accordingly, five layers like this incorporate 240 key bits and can be implemented by a circuit with 210 multiplexers and depth 20. The resulting network incorporates a relatively large number of key bits and has a very small size and depth, which, for a relatively small N such as N<=16, is impossible to achieve by networks resulting from simplified classical block ciphers and key-controlled bit permutations. In addition their cryptographic security is considerably improved.

In order to further increase security, it is desirable that the secret key used for data scrambling is innovated for each new execution of the cryptographic function on the data-processing device. In this way, the secret key used for data scrambling is itself much less exposed to side-channel attacks such as the power analysis attacks. As such, it also provides a certain degree of resistance to power analysis attacks.

The secret key is preferably generated by a random number generator implemented on the same device. Alternatively, but less securely, it can be generated by a pseudorandom number generator from a secret seed and some additional information which does not have to be secret or random, but is being innovated every once in a while.

The proposed building blocks can also be used for designing high-speed and small-size block ciphers suitable for hardware implementations in general. For this purpose a larger block size, for example N≧64, is preferably used, and the number of layers, i.e. rounds, is increased. Since the size and delay of each layer is considerably smaller than in usual iterated constructions of block ciphers, the number of rounds can be several times larger. For example, for the building block from FIG. 5 and N=128, the number of rounds can be about 32 or even larger.

Unlike the data scrambling functions, the encryption or decryption functions for block ciphers do not have to be performed in only one microprocessor cycle, so that they can be implemented by a combination of logical circuits and registers. For example, several layers combined can be implemented by a logical circuit. The pipelined architectures are extremely fast due to the small delay of each layer.

For cryptographic security, the layers should satisfy the three desirable additional criteria described above. Apart from that, two additional requirements regarding the connections between the layers are proposed.

First, two additional input and output secret keys of size N should be bitwise XORed with the input and the output bits, respectively, apart from the secret keys used in individual rounds which are called the round keys.

Figure 4:
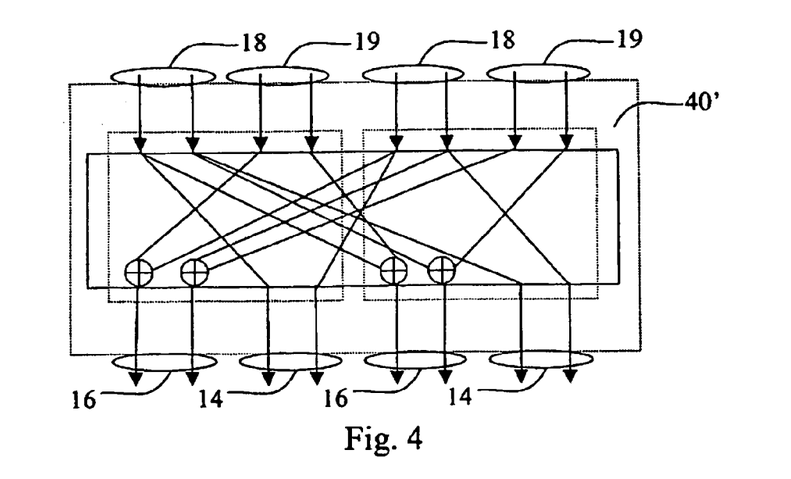
FIG. 4 is a block diagram of a second embodiment of a block connecting adjacent layers.

Second, in view of the statistical cryptanalytic methods such as the linear cryptanalysis of block ciphers, it is proposed to use very simple reversible linear functions between the layers, instead of using only the bit permutations. In particular, if the total numbers of transformed and control data bits per layer are equal, it is proposed to use the bit permutations designed as explained above and then to XOR every transformed data bit at the input to each layer with a distinct transformed data bit from the preceding layer. This usually does not increase the delay of the layers. An embodiment of a block 40' used for connecting adjacent layers, implementing a reversible linear function, is shown in FIG. 4. The block 40' shown implements an 8-bit reversible linear transformation, for m=n=2 and N=8.

In a combinatorial network realised according to the invention, the number of key bits per round, that is, the bit size of the round key is typically larger than the block size. This is of great advantage for data scrambling applications where the block size and the number or rounds are both relatively small.

For example, the building block shown in FIG. 5 requires three key bits per each input bit. As for block cipher applications the number of rounds is increased, the total number of key bits required is larger than in usual block cipher designs. These key bits can be produced from a smaller number of secret key bits, stored in a RAM, by a key expansion algorithm, which can be based, as explained hereinbelow, on a modified building block.

The key expansion algorithm produces the round keys iteratively and can itself be implemented in hardware by a combination of logical circuits and registers, so that not all the round keys have to be stored in RAM.

A modified building block, implementing the key expansion algorithm, operates as follows. Let K and K' denote the bit sizes of the secret key and the round key, respectively. The K secret key bits are first expanded by linear transformations into K' key bits by using an appropriate linear code so that any subset of K" expanded key bits are linearly independent, where K" is not small (K"<=K). In the terminology of error-correcting codes, the minimum distance of the dual of this linear code should be at least K"+1.

The obtained expanded key is then used as an input to a combinatorial network of block size K' which is parameterised by a fixed randomly generated key satisfying an additional condition that every multiplexer block in the network implements balanced binary lookup tables, that is, the binary lookup tables containing an equal number of 0's and 1's. The K' bits produced after every two layers of the combinatorial network are successively used as round keys, together with the K' input bits. As the number of layers is thus doubled when compared with the combinatorial network used for the block cipher itself, the building blocks used for the key expansion could be simplified.

Figure 6:
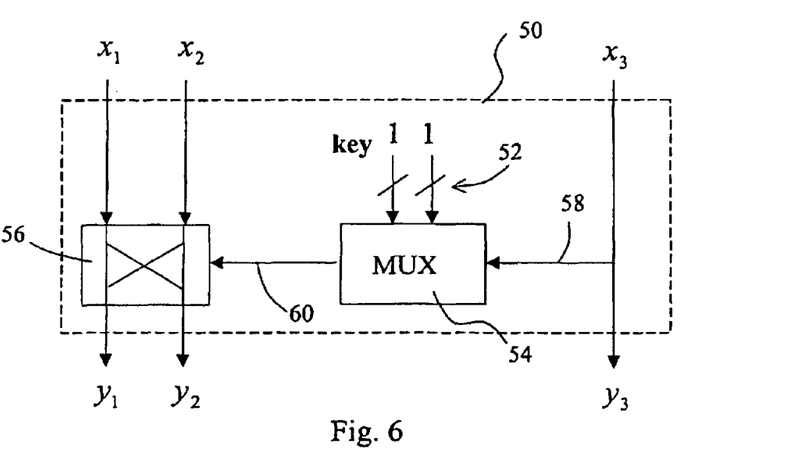
FIG. 6 is a block diagram of a simplified embodiment of a building block, realised according to the invention.

A possible embodiment of a simplified building block 50 is shown in FIG. 6, with parameters (m,n,k)=(1,2,1). Such a building block is obtained by removing the 2 XOR blocks and 1 control input from the building block shown in FIG. 5.

One input bit $x_3$ is used for controlling a multiplexer 54 and is passed to the output $y_3$ intact. The input bit $x_3$ selects one out of two key bits by means of the multiplexer circuit 54, which has one control bit 58, two 1-bit inputs 52 and one 1-bit output 60.

The 1-bit output 60 is used for controlling a block 56, implementing a simple reversible transformation $R_k$, transforming the input bits $x_1$ and $x_2$ into output bits $y_1$ and $y_2$. Block 56 comprises one controlled switch having two input bits, two output bits, and one control bit that determines if the input bits are swapped or not.

Alternatively, the K' round key bits can be produced after each layer of the combinatorial network, if one allows portions of successive round keys to be bit permutations of each other. In this iterated algorithm each round is a reversible transformation, so that a desirable criterion that each round key is uniformly random if the input to the first round is uniformly random is satisfied.

The key expansion algorithm can be simplified by using only linear transformations in the following way. The K secret key bits are first expanded by linear transformations into 2K' key bits, as described above, by using an appropriate linear code so that there are no small subsets of linearly dependent expanded key bit. The expanded 2K' bits are then used as the round keys for the first two rounds, whereas the subsequent pairs of successive round keys are produced by applying fixed bit permutations to the expanded key bits.

One embodiment of the proposed design of block ciphers is the encryption/decryption of copyright digital data to be stored in memories, such as EEPROM or flash memories, for example, for multimedia applications.

The invention claimed is:

1. A combinatorial key-dependent network for encryption/decryption of input digital data having a first word size into output digital data of the same word size, comprising at least two layers, each layer comprising at least an elementary building block, each building block operating on an input block of bits having a second word size smaller than or equal to said first word size, for generating an output block of bits, said building block comprising:
   a multiplexer circuit that receives a first portion of said input block of bits and a first set of key bits as inputs, the first portion of said input block of bits operable to select a second set of key bits out of the first set of key bits, wherein the selected second set of key bits are output by said multiplexer circuit, said first portion of bits are transferred intact without modification by an encryption operation to an output of said building block, and the number of bits in the second set of key bits is less than the number of bits in the first set of key bits; and
   a transformation circuit, for transforming a second portion of said input block of bits into transformed bits according to a reversible transformation chosen, by means of said selected second set of key bits, among a plurality of reversible transformations implemented in said transformation circuit, wherein said transformation circuit transforms said second portion of said input block of bits without receiving said first portion of said input block of bits as an input and said output block of bits comprises the transformed bits followed by said first portion of said input block of bits.

2. The network according to claim 1, wherein adjacent layers are connected by means of a fixed bit permutation block.

3. The network according to claim 2, comprising a plurality of fixed bit permutation blocks of the same type.

4. The network according to claim 2, comprising at least two different types of fixed bit permutation blocks.

5. The network according to claim 2, wherein bits in said first portion of said input block of bits are used, in a next layer, as bits to be transformed.

6. The network according to claim 2, wherein, for each building block, said first portion of said input block of bits are extracted from at least two building blocks in a preceding layer, provided that said first portion of said block of bits comprise at least two bits.

7. The network according to claim 2, wherein, for each building block, said second portion of said input block of bits are extracted from at least two building blocks in a preceding layer, provided that said second portion of said block of bits comprises at least two bits.

8. The network according to claim 1, wherein each layer comprises at least two building blocks.

9. The network according to claim 8, wherein said reversible transformations are such that each output bit of said transformed bits is a non-linear function of said first portion of said input block of bits and of said second set of key bits, with the algebraic normal form containing at least one binary product involving both said second portion of said input block of bits and said second set of key bits.

10. The network according to claim 9, wherein said reversible transformations satisfy a criterion that the uncertainty of the second portion of said input block of bits provided by uniformly random second set of key bits when the transformed bits are known is equal to a bit size of the transformed bits.

11. The network according to claim 1, wherein said multiplexer circuit comprises a lookup table whose content is defined by the first set of key bits.

12. The network according to claim 1, wherein said transformation circuit comprises XOR gates and controlled switches.

13. The network according to claim 12, wherein each XOR gate has two input bits and one output bit, one of the two input bits being a key bit, and each controlled switch has two input bits, two output bits and one control bit that determines if the input bits are swapped or not, said control bit being a key bit.

14. The network according to claim 13, wherein said multiplexer circuit has two control bits, four 3-bit inputs and one 3-bit output, and said transformation circuit comprises two XOR gates and one controlled switch.

15. The network according to claim 14, wherein the three bits of said 3-bit output are connected respectively to a first input bit of each XOR gate and to the control bit of said controlled switch.

16. The network according to claim 15, wherein a second input bit of each XOR gate is connected to a bit of said second portion of said input block of bits.

17. The network according to claim 16, wherein the output bits of said XOR gates are connected to the two input bits of said controlled switch.

18. The network according to claim 17, wherein the two output bits of said controlled switch generate the transformed bits of said transformation circuit.

19. The network according to claim 12, comprising a plurality of building blocks of the same type.

20. The network according to claim 1, comprising at least two different types of building blocks.

21. The network according to claim 1, wherein adjacent layers are connected by means of a block implementing a reversible linear function.

22. The network according to claim 1, wherein two additional input and output keys having a word size equal to the first word size are bitwise XORed respectively with said input digital data and with said output digital data.

23. The network according to claim 1, wherein said first set of key bits in each layer, having a first bit size, are generated from a smaller number of secret key bits, having second bit size, by means of a key expansion algorithm.

24. The network according to claim 23, wherein said secret key bits are first expanded by means of linear transformations into said first set of key bits, using a linear code so that any subset of expanded key bits having a third bit size, are linearly independent, where the third bit size is less than or equal to the second bit size.

25. The network according to claim 24, wherein said expanded key having first bit size is used as an input to a further combinatorial key-dependent network having a of block size equal to the first bit size which is parameterised by a fixed randomly generated key satisfying the condition that every multiplexer implements balanced binary lookup tables.

26. The network according to claim 25, wherein the expanded key having the first bit size produced after every two layers of said further combinatorial key-dependent network are used as said first set of key bits from the multiplexer circuits within the layers of the combinatorial network.

27. The network according to claim 25, wherein said further combinatorial key-dependent network comprises a plurality of layers, each layer comprising a plurality of simplified building blocks, each building block comprising:
   a multiplexer having one input receiving one control bit which is passed to the output intact, for selecting one out of two key bits on a one bit output; and
   a controlled switch having two input bits, two output bits and one control bit connected to the output of said multiplexer, said control bit determining if said two input bits are swapped or not.

28. A block for secret-key-controlled cryptographic functions, operating on an input block of bits for generating an output block of bits comprising:
   a multiplexer circuit that receives a first portion of bits of said input block of bits and a first set of key bits as inputs, the first portion of said input block of bits operable to select a second set of key bits out of the first set of key bits, wherein the selected second set of key bits are output by said multiplexer circuit, said first portion of bits are transferred intact without modification by an encryption operation to an output of said building block, and the number of bits in the second set of key bits is less than the number of bits in the first set of key bits; and
   a transformation circuit for transforming a second portion of said input block of bits into transformed bits, according to a reversible transformation chosen, by means of said selected second set of key bits, among a plurality of reversible transformations implemented in said transformation circuit, wherein said transformation circuit transforms said second portion of said input block of bits without receiving said first portion of said input block of bits as an input and said output block of bits comprises the transformed bits followed by said first portion of said input block of bits.

29. The block according to claim 28, wherein said transformation circuit comprises XOR gates and controlled switches.

30. The block according to claim 29, wherein each XOR gate has two input bits and one output bit, one of the two input bits being a key bit, and each controlled switch has two input bits, two output bits and one control bit that determines if the input bits are swapped or not, said control bit being a key bit.

31. The block according to claim 30, wherein said multiplexer circuit has two control bits, four 3-bit inputs and one 3-bit output, and said transformation circuit comprises two XOR gates and one controlled switch.

32. The block according to claim 31, wherein the three bits of said 3-bit output are connected respectively to a first input bit of each XOR gate and to the control bit of said controlled switch.

33. The block according to claim 32, wherein a second input bit of each XOR gate is connected to a bit of said second portion of said block of bits.

34. The block according to claim 33, wherein the output bits of said XOR gates are connected to the two input bits of said controlled switch.

35. The block according to claim 34, wherein the two output bits of said controlled switch generate the transformed bits of said transformation circuit.

36. A method for encryption/decryption of input digital data having a first word size into an output digital data of the same word size, comprising;
  a) dividing said input digital data into blocks of bits, each having a second word size smaller than said first word size, each block of bits being divided into a first portion and a second portion;
  b) for each block of bits:
    b1) receiving, at a multiplexer circuit, a first portion of said input block of bits and a first set of key bits as inputs, the first portion of said input block of bits operating to select a second set of key bits out of the first set of key bits, wherein the selected second set of key bits are output by the multiplexer circuit, said first portion of bits are transformed intact without modification by an encryption operation to a first portion of transformed bits, and the number of bits in the second set of key bits is less than the number of bits in the first set of key bits;
    b2) selecting, by means of said selected second set of key bits, a reversible transformation among a plurality of reversible transformations, by inputting said selected second set of key bits into a transformation circuit without also inputting said first portion of bits into said transformation circuit;
    b3) applying said reversible transformation to said second portion of bits, thus generating a second portion of transformed bits;
  c) collecting the transformed bits from each block into said output digital data, wherein the transformed bits from each block comprise the second portion of transformed bits followed by the first portion of transformed bits.

37. The method according to claim 36, wherein said step b) is reiterated on a block of bits comprising said first and second portions of previously transformed bits.

38. The method according to claim 37, wherein, before each reiteration of step b), a fixed bit permutation is applied to said previously transformed bits.

39. The method according to claim 37, wherein, before each reiteration of step b), a reversible linear function is applied to said previously transformed bits.

40. A data processing device comprising a central processing unit, volatile or non-volatile memory, and at least a data, instruction or address bus, comprising at least a combinatorial key-dependent network according to any one of claims 1 to 27, for encryption/decryption of digital data on said data, instruction, or address bus and/or into said memories.

41. A multimedia device for storing and playing copyright digital data comprising at least a combinatorial key-dependent network according to any one of claims 1 to 27, for encryption/decryption of said copyright digital data.

\* \* \* \* \*

UNITED STATES PATENT AND TRADEMARK OFFICE
CERTIFICATE OF CORRECTION

| | | |
|---|---|---|
| PATENT NO. | : 7,913,083 B2 | |
| APPLICATION NO. | : 10/568618 | |
| DATED | : March 22, 2011 | |
| INVENTOR(S) | : Jovan Golic | |

It is certified that error appears in the above-identified patent and that said Letters Patent is hereby corrected as shown below:

On the Title Page, Item (57), in the Abstract, line 13, "can easily he made larger than m+n." should read --can easily be made larger than m+n.--.

Claim 19, column 9, line 64, "according to claim 12," should read --according to claim 1,--.

Claim 25, column 10, lines 21-22, "having a of block size" should read --having a block size--.

Signed and Sealed this

Fifteenth Day of January, 2013

David J. Kappos
*Director of the United States Patent and Trademark Office*